United States Patent
Hoffmeister et al.

(10) Patent No.: US 9,592,640 B2
(45) Date of Patent: Mar. 14, 2017

(54) METHOD FOR CURING SHELL COMPONENTS

(71) Applicant: Airbus Operations GmbH, Hamburg (DE)

(72) Inventors: Thomas Hoffmeister, Hamburg (DE); Markus Mueller, Friedrichshafen (DE); M. Ichwan Zuardy, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/522,786

(22) Filed: Oct. 24, 2014

(65) Prior Publication Data

US 2015/0298401 A1   Oct. 22, 2015

(30) Foreign Application Priority Data

Oct. 30, 2013   (DE) .................. 10 2013 222 106

(51) Int. Cl.

| | |
|---|---|
| *B29C 70/34* | (2006.01) |
| *B29C 33/02* | (2006.01) |
| *B29C 33/48* | (2006.01) |
| *B29C 70/46* | (2006.01) |
| *B29D 99/00* | (2010.01) |
| *B29C 70/54* | (2006.01) |
| *B29L 31/30* | (2006.01) |

(52) U.S. Cl.
CPC ............ *B29C 70/34* (2013.01); *B29C 33/02* (2013.01); *B29C 33/48* (2013.01); *B29C 70/345* (2013.01); *B29C 70/462* (2013.01); *B29C 70/54* (2013.01); *B29D 99/0003* (2013.01); *B29L 2031/3076* (2013.01); *B29L 2031/3082* (2013.01)

(58) Field of Classification Search
None
See application file for complete search history.

(56) References Cited

U.S. PATENT DOCUMENTS

| | | |
|---|---|---|
| 4,492,607 A | 1/1985 | Halcomb |
| 4,633,632 A | 1/1987 | Sarh |
| 4,717,330 A | 1/1988 | Sarh |
| 6,413,074 B1 | 7/2002 | Hays |
| 2012/0061006 A1 | 3/2012 | Marquardt |

FOREIGN PATENT DOCUMENTS

| | | | |
|---|---|---|---|
| DE | 33 41 564 A1 | 5/1985 | |
| DE | 10 2009 001 075 A1 | 9/2010 | |
| DE | 10 2009 057 009 A1 | 6/2011 | |
| FR | 2 717 735 A1 | 9/1995 | |
| GB | 1317779 A * | 5/1973 | ............ B29C 70/00 |
| WO | 2010/094808 A2 | 8/2010 | |
| WO | 2013/122524 A1 | 8/2013 | |

OTHER PUBLICATIONS

EP Search Report (EP 14190066.2) dated Mar. 18, 2015.

* cited by examiner

*Primary Examiner* — Barbara J Musser
(74) *Attorney, Agent, or Firm* — Lerner, David, Littenberg, Krumholz & Mentlik, LLP

(57) ABSTRACT

A curing tool for a shell component, includes a first tool component, which is a polyhedron and has a wedge-shaped bevel forming a first sheared edge on a first side edge, and a second tool component, which is a polyhedron, has a wedge-shaped bevel forming a second sheared edge on a first side edge and has a first corner bevel on a second side edge diagonally opposite the first side edge. The wedge angles of the first and the second sheared edge are equal.

12 Claims, 2 Drawing Sheets

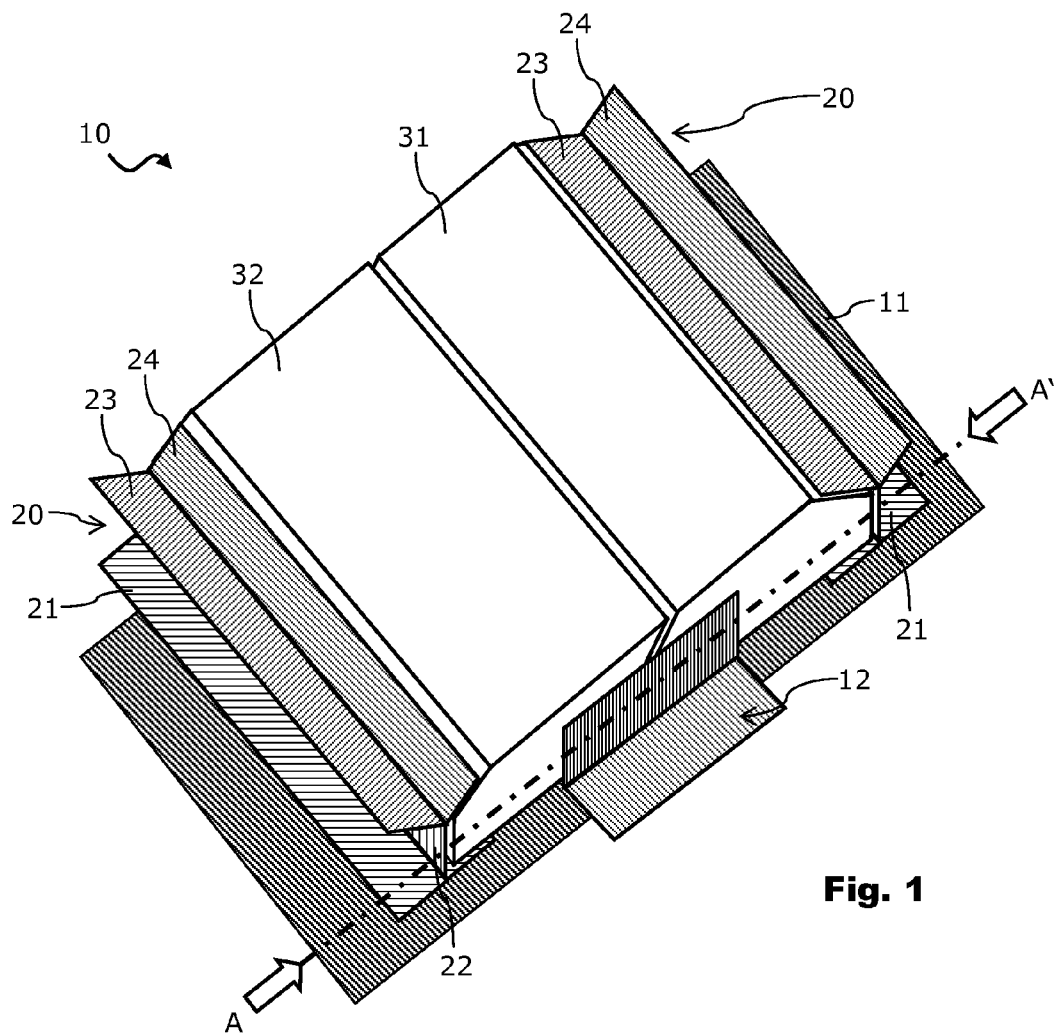
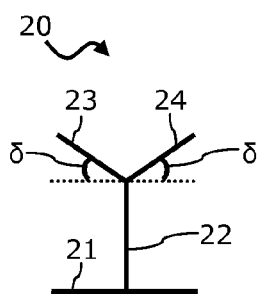
Fig. 2
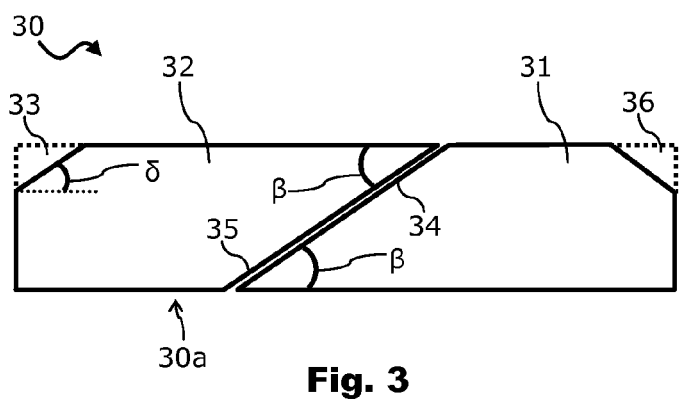
Fig. 3

METHOD FOR CURING SHELL COMPONENTS

FIELD OF THE INVENTION

The present invention relates to a curing tool for shell components and to various methods for curing shell components, in particular fibre-reinforced plastics components for outer skin components of aircraft.

BACKGROUND OF THE INVENTION

Aircrafts of the next generation require sophisticated concepts for manufacturing structural elements of the fuselage from fibre-reinforced plastics components (FRP). In this case, it is important in particular to reduce production costs when curing the FRP, to minimise the manufacturing time and to optimise the manufacturing logistics.

Methods and processes which composite-cure complex FRP components made up of many individual parts, what are known as co-curing methods or wet-on-wet methods, provide optimal structural stability of the finished cured components. The components produced are also lighter and have better surface properties than components produced using alternative procedures, for example bonding methods. However, composite-curing methods often require complex curing tools that are specifically adapted to the shape of the component. Moreover, complex component geometries can often only be produced using many time-consuming individual steps for tool assembly.

WO 2013/122524 A1 discloses a method and a tool for curing an integrated structure made up of a skin component comprising stringers and rib flanges. In this case, however, complex moulding tools having multiple parts are required.

There is therefore the need for solutions for the composite-curing of stringers comprising a skin for producing shell components, which solutions are adaptable, flexible and easy to implement and require as few curing tool components as possible.

BRIEF SUMMARY OF THE INVENTION

Therefore, a first aspect of the invention relates to a curing tool for a shell component, comprising a first tool component, which a cross-section having four or five sides and has a wedge-shaped bevel forming a first sheared edge on a first side edge, and a second tool component, which has a cross-section having five sides, has a wedge-shaped bevel forming a second sheared edge on a first side edge and has a first corner bevel on a second side edge diagonally opposite the first side edge. The wedge angles of the first and the second sheared edge are preferably equal.

Furthermore, a second aspect of the invention relates to a method for curing shell components, comprising the steps of placing a fibre-reinforced stringer prepreg comprising a stringer foot and a stringer web pointing away from a skin portion on the skin portion, arranging a first tool component, which has a cross-section having four or five sides and has a wedge-shaped bevel forming a first sheared edge on a first side edge, on the skin portion, so that the first sheared edge points away from the skin portion, arranging a second tool component, which has a cross-section having five sides, has a wedge-shaped bevel forming a second sheared edge on a first side edge, the wedge angle of the first and the second sheared edge preferably being equal, and has a first corner bevel on a second side edge diagonally opposite the first side edge, on the skin portion and at least part of the stringer foot, so that the second sheared edge rests on the first sheared edge and a flange portion of the stringer prepreg projects over the first corner bevel of the second tool component at a flange angle relative to the stringer foot, and composite-curing the stringer prepreg using the first and second tool components to form a composite together with the skin portion.

In addition, a third aspect of the invention relates to a method for curing shell components, comprising the steps of arranging a first tool component, which has a cross-section having four or five sides and has a wedge-shaped bevel forming a first sheared edge on a first side edge, on a portion of a stringer foot of a first fibre-reinforced stringer prepreg comprising a stringer foot and a stringer web, so that the first sheared edge points away from the stringer foot, arranging a second tool component, which has a cross-section having five sides, has a wedge-shaped bevel forming a second sheared edge on a first side edge, the wedge angle of the first and the second sheared edge preferably being equal, and has a first corner bevel on a second side edge diagonally opposite the first side edge, on a portion of a stringer foot of a second fibre-reinforced stringer prepreg comprising a stringer foot and a stringer web, so that the second sheared edge rests on the first sheared edge and a flange portion of the second stringer prepreg projects over the first corner bevel of the second tool component at a flange angle relative to the stringer foot, placing the assembly made up of the first stringer prepreg, the second stringer prepreg, the first tool component and the second tool component on a skin portion of the shell component, and composite-curing the first and second stringer prepreg using the first and second tool components to form a composite together with the skin portion.

According to one embodiment of the invention, the first tool component may have a second corner bevel on a second side edge diagonally opposite the first side edge. According to a further embodiment, the second corner bevel may extend substantially parallel to the first sheared edge. This allows what are known as TY-stringers to be used, that is to say T-stringers which are placed on a skin portion of the shell component that have a Y-shape at the upper end thereof.

According to a further embodiment of the invention, the first tool component and the second tool component may be made of metal material, for example of aluminium, steel, nickel or a nickel-steel alloy.

According to a further embodiment the invention, the wedge angle may be between 10° and 35°. In this case, the wedge angle may be selected depending on the material properties of the shell component when removing the curing tool after the curing process, in order to prevent layers of the skin portion or of the stringers from delaminating.

According to a further embodiment of the invention, the first corner bevel may extend substantially parallel to the second sheared edge.

According to one embodiment of the invention, the flange angle may be greater than the wedge angle. This allows the method to be used for curved skin portions, the adjacent stringers of which comprise webs which are not entirely parallel to one another. By selecting a larger flange angle, the same curing tool can be used for different shell components having different radii of curvature of the skin portions, and as a result there is less implementation complexity when providing the curing tools.

According to a further embodiment of the invention, the method further comprises removing the second tool component after the composite-curing by moving the second tool component away from the skin portion along the first sheared edge of the first tool component. This shearing movement allows two-part curing tools to be used instead or three-part or multiple-part curing tools.

According to a further embodiment of the invention, the flange angle may be greater than the wedge angle by less than 3°.

BRIEF DESCRIPTION OF THE DRAWINGS

The invention will be described in greater detail in the following in conjunction with and in relation to the embodiments as in the accompanying drawings.

The accompanying drawings give a better understanding of the present invention, and show example variants of the invention. They serve to explain principles, advantages, technical effects and possible variations. Naturally, other embodiments and many of the intended advantages of the invention are also conceivable, in particular in view of the detailed description of the invention set out in the following. The elements in the drawings are not necessarily shown to scale, and are shown in a simplified form or schematically in some cases for reasons of clarity. Like reference numerals denote like or equivalent components or elements.

FIG. 1 is a schematic perspective view of a shell component together with a curing tool according to an embodiment of the invention;

FIG. 2 is a schematic cross section through a stringer for a shell component according to a further embodiment of the invention;

FIG. 3 is a schematic cross section through a curing tool for a shell component according to a further embodiment of the invention;

DETAILED DESCRIPTION

Figure 4:
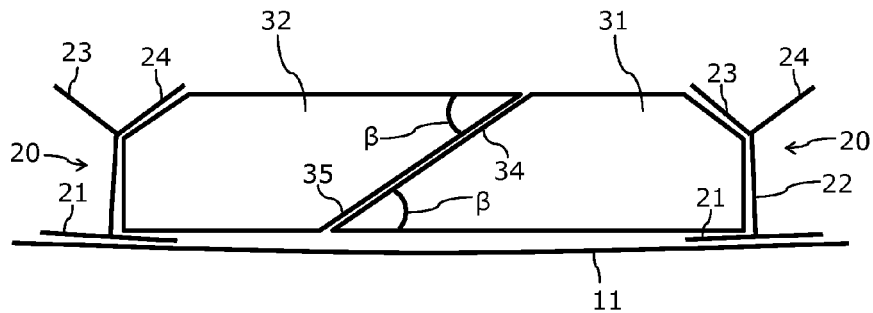
FIG. 4 is a schematic cross section through a shell component together with a curing tool according to a further embodiment of the invention.

Although special embodiments are disclosed and described herein, it is clear to the person skilled in the art that a wide range of further, alternative and/or equivalent implementations of the embodiments can be selected without substantially deviating from the basic concept of the present invention. In general, any variations on, modifications to and alterations to the embodiments disclosed herein should also be considered to be covered by the invention.

FIG. 1 is a schematic perspective view of a shell component 10 together with a curing tool. The shell component 10 comprises a skin portion 11, which may for example comprise a fibre-reinforced plastics material. The skin portion 11 is shown in FIG. 1 as a planar skin portion; however the skin portion 11 may also be curved. Curved shapes for the skin portion 11 are advantageous in particular when the shell component 10 is used in wing or aerofoil structures of aircraft.

Stringer prepregs 20 are arranged on the skin portion 11 which each have a stringer foot 21, by means of which the stringer prepreg 20 is placed on the skin portion 11. A stringer web 22 which forks into two flange portions 23 and 24 at its end facing away from the stringer foot 21 is perpendicular or substantially perpendicular to the stringer foot 21. In this case, the flange portions 23 and 24 are oblique to the plane of the stringer foot 21 at a flange angle. The stringers 20 may consist of multi-layered fibre-reinforced plastics material.

Furthermore, one or more rib feet 12 (or former connection brackets) may optionally be arranged on the skin portion 11, to which feet ribs or formers can be attached for stabilising the shell component 10. In this case, the rib feet 12 generally extend perpendicular to the stringer webs 22 in the plane of the skin portion 11.

For composite-curing, what is known as "co-curing", the stringers 20 to the skin portion, two tool components 31 and 32 are inserted between each two adjacent stringers 20. The first tool component 31 generally has a cross-section having four or five sides and has a wedge-shaped bevel forming a first sheared edge on a first side edge. The second tool component 32 also generally has a cross-section having five sides and has a wedge-shaped bevel forming a second sheared edge on a first side edge. In addition, the second tool component 32 has a first corner bevel on a second side edge diagonally opposite the first side edge.

The two tool components 31 and 32 may for example be made of a metal material, for example aluminium, steel, nickel or a nickel-steel alloy ("Invar").

The wedge angles of the first and the second sheared edge are equal in this case, so that the second tool component 32 can rest in a plane-parallel manner on the first sheared edge of the first tool component 31. In this case, the two tool components 31 and 32 together form a substantially curing tool having a cross-section having four or five sides, which only has corresponding corner bevels on the corners adjacent to the flange portions 23 and 24. The corner bevels may extend substantially parallel to the first or second sheared edges.

FIGS. 2 to 7 are each possible cross sections through the shell component 10, together with the curing tool from FIG. 1, along line A-A'.

FIG. 2 is a cross section of a detail of a stringer 20. This shows the stringer foot 21, the stringer web 22, which is perpendicular to the stringer foot, and the two end portions as flanges 23 and 24. In this case, the stringer 20 forms a TY-profile, that is to say the cross section thereof forms a T-profile in the lower foot region and a Y-profile in the upper flange region. In this case, the two flange portions 23 and 24 are at a flange angle δ relative to the stringer foot 21. The two flange angles δ of the flange portions 23 and 24 may be equal in this case; however, it may also be possible to select different flange angles δ.

FIG. 3 is a cross section of a detail of a curing tool 30. The tool components 31 and 32 each have a wedge shape having a wedge angle β on the sheared surface of the two sheared edges 34 and 35. The wedge angle β may be between 10° and 35°, for example. For planar skin portions 11, the wedge angle β may be selected to be in the range of approximately 15°. For curved skin portions 11, the wedge angle β may be selected to be greater, for example between 20° and 30°.

The first tool component 31 has a corner bevel 36 on a second side edge diagonally opposite the first side edge, which corner bevel may extend substantially parallel to the first sheared edge 34. Preferably, the corner bevel 36 may be inclined at the flange angle δ relative to the underside of the first tool component 31 or to the horizontal. Likewise, the second tool component 32 has a corner bevel 33 on a second side edge diagonally opposite the first side edge, which corner bevel may extend substantially parallel to the first sheared edge 35. Preferably, the corner bevel 33 may be inclined at the flange angle δ relative to the underside of the second tool component 32 or to the horizontal.

FIG. 4 shows a method stage for composite-curing stringers 20 to a skin portion 11 by the curing tool 30 comprising the tool components 31 and 32 being placed on the curved skin portion 11 and being inserted between the two stringers 20. The flange portions 24 on the left-hand side and the flange portions 23 on the right-hand side are arranged such that they project beyond the respective corner bevels 33 and 36. For this purpose, the two flange angles δ are each greater than the respective wedge angles β by a small amount. For example, the flange angle δ may be greater than the wedge angle β by less than 3°, for example 2°. In this case, the clearance for the flange angle δ is determined by the radius of curvature of the skin portion 11 and the spacing between adjacent stringers 20.

Figure 5:
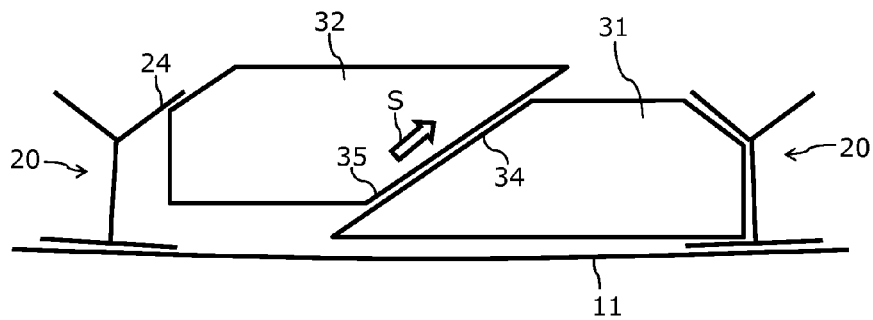
FIG. 5 is a schematic cross section through a shell component together with a curing tool according to a further embodiment of the invention.

FIG. 5 shows a method stage after composite-curing of the stringers 20 to the skin portion 11 from FIG. 4. Owing to the corner bevel, the second tool component 32 may be moved out under the stringer 20 relative to the flange portion 24 in a shearing movement S along the sheared surface formed by the sheared edges 34 and 35. For this purpose, it is necessary for the flange angle δ to be greater than the wedge angle β, in particular for curved skin portions 11. The wedge angle β itself depends on the required removal direction or the required removal angle of the tool components 31 and 32 from the skin portion 11, so that delamination of or damage to the skin portion 11 or the stringer feet 21 of the stringers 20 is prevented after composite-curing.

Figure 6:
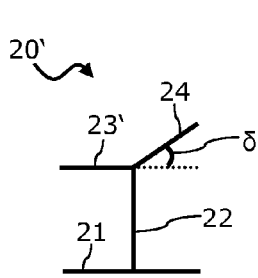
FIG. 6 is a schematic cross section through a stringer for a shell component according to a further embodiment of the invention.

FIG. 6 is a further embodiment of a cross section through a stringer 20'. The stringer 20' differs from the stringer 20 in FIG. 2 substantially in that, unlike the flange portion 24, the flange portion 23' is not at an angle, but rather is parallel to the stringer foot 21. Since the flange portion 23' is not at an angle, the overall height of the stringer 20' can be reduced, and this may lead to space being saved in the interior of an aircraft fuselage encased with corresponding shell components 10, for example in the region of the fuel tank, which as a result could have a greater capacity.

Figure 7:
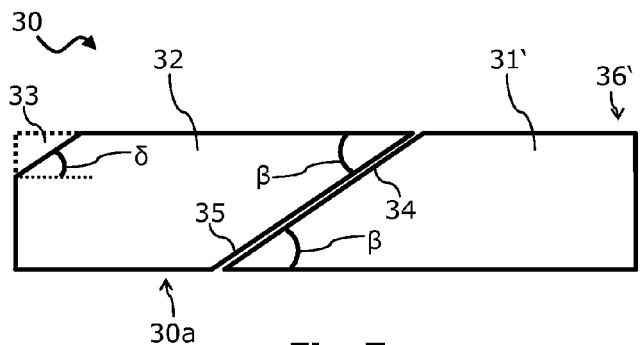
FIG. 7 is a schematic cross section through a curing tool for a shell component according to a further embodiment of the invention.

A corresponding curing tool 30', which can be used in conjunction with the stringers 20' in FIG. 6, is shown in FIG. 7. The curing tool 30' substantially differs from the curing tool 30 in FIG. 3 in that a tool component 31' which does not have a corner bevel but instead has a complete corner in the region 36' is provided instead of a first tool component 31. As a result, the tool component 31' can be inserted under the flange portion 23' of the stringer 20'. After the tool component 32 is removed, the tool component 31' can be removed from the stringer 20' by a shearing movement that is also parallel to the skin portion 11.

Figure 8:
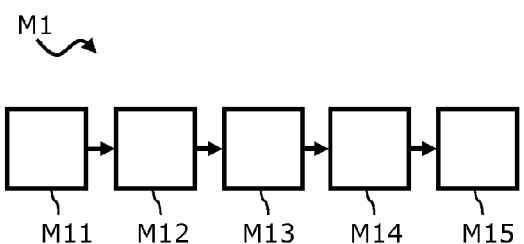
FIG. 8 shows a block diagram for a method for curing a shell component according to a further embodiment of the invention.

FIG. 8 schematically shows a method M1 for curing a shell component, for example the shell component 10 in FIG. 1. In the method M1, a curing tool 30 or 30' from FIG. 3, 4, 5 or 7 can be used, for example.

In a first step M11, a fibre-reinforced stringer prepreg 20, 20' comprising a stringer foot 21 and a stringer web 22 pointing away from a skin portion 11 is placed on the skin portion 11. In a second step M12, a first tool component 31, which has a cross-section having four or five sides and has a wedge-shaped bevel forming a first sheared edge 34 on a first side edge, is then arranged on the skin portion 11, so that the first sheared edge 34 points away from the skin portion 11. In a third step M13, a second tool component 32, which also has a cross-section having five sides, has a wedge-shaped bevel forming a second sheared edge 35 on a first side edge and has a first corner bevel 33 on a second side edge diagonally opposite the first side edge, is arranged on the skin portion 11 and at least part of the stringer foot 21. The wedge angles β of the first and the second sheared edge 34, 35 are equal in this case. When arranging the second tool component 32, the second sheared edge 35 rests on the first sheared edge 34 along a sheared surface and a flange portion 24 of the stringer prepreg 20, 20' projects beyond the first corner bevel 33 of the second tool component 32 at a flange angle δ relative to the stringer foot 21.

Then, in step M14, the stringer prepreg 20, 20' can be composite-cured ("co-cured") using the first and second tool components 31, 32 to form a composite together with the skin portion 11. Optionally, it is possible, in a step M15, to remove the second tool component 32 after the composite-curing by moving the second tool component 32 away from the skin portion 11 along the first sheared edge 34 of the first tool component 31.

Figure 9:
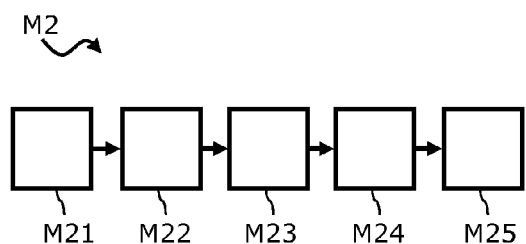
FIG. 9 shows a block diagram for another method for curing a shell component according to a further embodiment of the invention.

FIG. 9 schematically shows a further method M2 for curing a shell component, for example the shell component 10 in FIG. 1. In the method M2, a curing tool 30 or 30' from FIG. 3, 4, 5 or 7 can be used, for example.

In a first step M21, a first tool component 31, which has a cross-section having four or five sides and has a wedge-shaped bevel forming a first sheared edge 34 on a first side edge, is arranged on a portion of a stringer foot 21 of a first fibre-reinforced stringer prepreg 20 or 20' comprising a stringer foot 21 and a stringer web 22, so that the first sheared edge 34 points away from the stringer foot 21. Then, in step M22, a second tool component 32, which has a cross-section having five sides, has a wedge-shaped bevel forming a second sheared edge 35 on a first side edge and has a first corner bevel 33 on a second side edge diagonally opposite the first side edge, can be arranged on a portion of a stringer foot 21 of a second fibre-reinforced stringer prepreg 20 or 20' comprising a stringer foot 21 and a stringer web 22 such that the second sheared edge 35 rests on the first sheared edge 34 and a flange portion 24 of the second stringer prepreg 20 or 20' projects over the first corner bevel 33 of the second tool component 32 at a flange angle δ relative to the stringer foot 21. The wedge angles β of the first and the second sheared edge 34, 35 are equal in this case.

In step M23, the assembly made up of the first stringer prepreg 20 or 20', the second stringer prepreg 20 or 20', the first tool component 31 and the second tool component 32 can then be placed as a whole on a skin portion 11 of the shell component 10. Then, in step M24, the first and second stringer prepreg 20 or 20' are composite-cured ("co-cured") using the first and second tool components 31 and 32 to form a composite together with the skin portion 11.

Optionally, it is also possible in this case, in a step M25, to remove the second tool component 32 after the composite-curing by moving the second tool component 32 away from the skin portion 11 along the first sheared edge 34 of the first tool component 31.

The methods M1 and M2 are suitable for both planar and curved skin portions 11. Furthermore, rib feet, such as the rib feet 12 in FIG. 1, can be cured to form a composite together with the stringer prepregs 20, 20' and the skin portion 11. Owing to the methods M1 and M2, the number of tool components required can reduced to two. Furthermore, the methods M1 and M2 are extremely flexible, since changes only need to be made to one of the tool components if the local design of the shell components 10 changes. Owing to the composite-curing, high mechanical strength of the shell component 10 can be achieved.

The invention claimed is:

1. A method for curing a shell component, comprising:
   placing a fibre-reinforced stringer prepreg comprising a stringer foot and a stringer web pointing away from a skin portion on the skin portion;
   arranging a first tool component having a cross-section having four or five sides and a wedge-shaped bevel forming a first sheared edge on a first side edge, on the skin portion, so that the first sheared edge points away from the skin portion;
   arranging a second tool component having a cross-section having five sides, a wedge-shaped bevel forming a second sheared edge on a first side edge, the wedge angle of the first and the second sheared edge being equal, and a first corner bevel on a second side edge diagonally opposite the first side edge, on the skin portion and at least part of the stringer foot, so that the second sheared edge rests on the first sheared edge and a flange portion of the stringer prepreg projects over the first corner bevel of the second tool component at a flange angle relative to the stringer foot; and
   composite-curing the stringer prepreg using the first and second tool components to form a composite together with the skin portion.

2. The method according to claim 1, wherein the wedge angle is between 10° and 35°.

3. The method according to claim 2, wherein the flange angle is greater than the wedge angle.

4. The method according to claim 3, wherein the flange angle is greater than the wedge angle by less than 3°.

5. The method according to claim 1, further comprising:
   removing the second tool component after the composite-curing by moving the second tool component away from the skin portion along the first sheared edge of the first tool component.

6. The method according to claim 1, wherein the skin portion is curved.

7. A method for curing a shell component, the method comprising:
   arranging a first tool component having a cross-section having four or five sides and a wedge-shaped bevel forming a first sheared edge on a first side edge, on a portion of a stringer foot of a first fibre-reinforced stringer prepreg comprising a stringer foot and a stringer web, so that the first sheared edge points away from the stringer foot;
   arranging a second tool component having a cross-section having five sides, a wedge-shaped bevel forming a second sheared edge on a first side edge, the wedge angle of the first and the second sheared edge being equal, and a first corner bevel on a second side edge diagonally opposite the first side edge, on a portion of a stringer foot of a second fibre-reinforced stringer prepreg comprising a stringer foot and a stringer web, so that the second sheared edge rests on the first sheared edge and a flange portion of the second stringer prepreg projects over the first corner bevel of the second tool component at a flange angle relative to the stringer foot;
   placing the assembly made up of the first stringer prepreg, the second stringer prepreg, the first tool component and the second tool component on a skin portion of the shell component; and
   composite-curing the first and second stringer prepreg using the first and second tool components to form a composite together with the skin portion.

8. The method according to claim 7, wherein the wedge angle is between 10° and 35°.

9. The method according to claim 8, wherein the flange angle is greater than the wedge angle.

10. Method according to claim 9, wherein the flange angle is greater than the wedge angle by less than 3°.

11. The method according to claim 7, further comprising:
    removing the second tool component after the composite-curing by moving the second tool component away from the skin portion along the first sheared edge of the first tool component.

12. The method according to claim 7, wherein the skin portion is curved.

* * * * *